United States Patent [19]

Rudolf

[11] Patent Number: 5,202,882
[45] Date of Patent: Apr. 13, 1993

[54] METHOD FOR CHECKING TRANSMISSION PROPERTIES OF A SUBSCRIBER LINE CIRCUIT

[75] Inventor: Hans-Werner Rudolf, Munich, Fed. Rep. of Germany

[73] Assignee: Siemens Aktiengesellschaft, Munich, Fed. Rep. of Germany

[21] Appl. No.: 683,689

[22] Filed: Apr. 11, 1991

[30] Foreign Application Priority Data

Apr. 12, 1990 [DE] Fed. Rep. of Germany ....... 4011985

[51] Int. Cl.⁵ ............................. H04J 3/14; H04M 3/30
[52] U.S. Cl. ................................... 370/17; 328/147; 379/27; 371/20.1
[58] Field of Search ................ 370/17, 85.1, 16, 14; 307/350, 355, 358, 498; 328/147, 160; 379/27, 28, 31; 371/20.1

[56] References Cited
U.S. PATENT DOCUMENTS

| 4,376,450 | 3/1983 | Fayfield et al. | 328/147 |
| 4,583,216 | 4/1986 | Gatmezei et al. | 370/17 |
| 4,730,302 | 3/1988 | Fuerlinger et al. | 370/17 |
| 4,999,521 | 3/1991 | Rusznyak | 307/498 |
| 5,039,878 | 8/1991 | Armstrong et al. | 307/355 |

Primary Examiner—Douglas W. Olms
Assistant Examiner—Min Jung
Attorney, Agent, or Firm—Hill, Steadman & Simpson

[57] ABSTRACT

Given the prerequisite of a division of a subscriber line circuit into a high-voltage portion and a signal processor that defines the transmission-oriented properties, voltages arising at significant locations of the receiving branch and of the transmitting branch of the signal processor as a result of supplied and reflected sine signals are taken via a digital interface and specific transmission properties such as reflection attenuation and hybrid transfer attenuation are calculated therefrom on the basis of a correlation.

2 Claims, 2 Drawing Sheets

METHOD FOR CHECKING TRANSMISSION PROPERTIES OF A SUBSCRIBER LINE CIRCUIT

BACKGROUND OF THE INVENTION

1. Field of the Invention

The present invention relates to a method for checking the transmission properties of a subscriber line circuit together with subscriber line and subscriber terminal equipment connected thereto in a digital time-division multiplex (TDM) telecommunication system, and more particularly in which the subscriber line circuit is composed of a high-voltage module that predominantly contains line drivers as well as elements for indicating subscriber line state and a signal processor module wherein, among other things, the analog-to-digital conversion and the digital-to-analog conversion, the realization of a two-wire-to-four-wire conversion, the setting of the two-wire impedance and the transmission and receiving signal amplification occur.

2. Description of the Prior Art

Heretofore, such tests were implemented with a separate testing device that had access to specific circuit points of the subscriber line circuit or of the subscriber line via operated relays.

SUMMARY OF THE INVENTION

The object of the present invention is to provide a method for checking the transmission properties of a subscriber line circuit wherein the conditions initially set forth are established and for which such a test access via relays can be forgone in the implementation thereof.

The above object is achieved, according to the present invention, in that various locations of the receiving branch and of the transmitting branch of the signal processor module are accessed via a digital interface and a correlation product is formed from different combinations of, respectively, two voltages from those voltages that occur at these locations during the operation of the subscriber line circuit, or due to separately-supplied and reflected signals, the evaluation of this correlation product respectively yielding a particular information about a specific transmission-oriented property.

In accordance with a further development and feature of the invention, an access and a correlation processing also occur for the result of the evaluation of the direct-access component of current that is obtained in the high-voltage portion.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
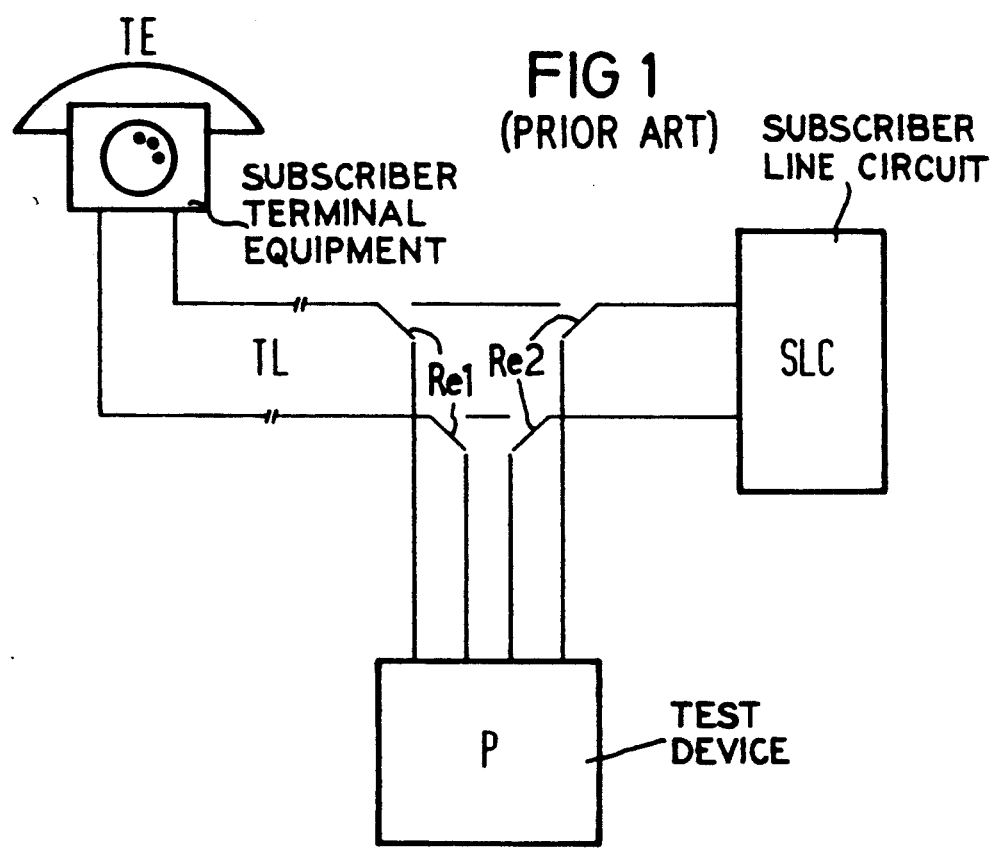
FIG. 1 is a schematic representation of a test access via relays as practiced heretofore.

Referring to FIG. 1, a subscriber terminal equipment TE is illustrated as connected to a subscriber line circuit SLC via a subscriber line TL. A testing device P whose properties shall not be discussed in detail has access to the subscriber line TL and to the subscriber line circuit SLC via relays Re1 and Re2 (symbolically illustrated by switch contacts).

Figure 2:
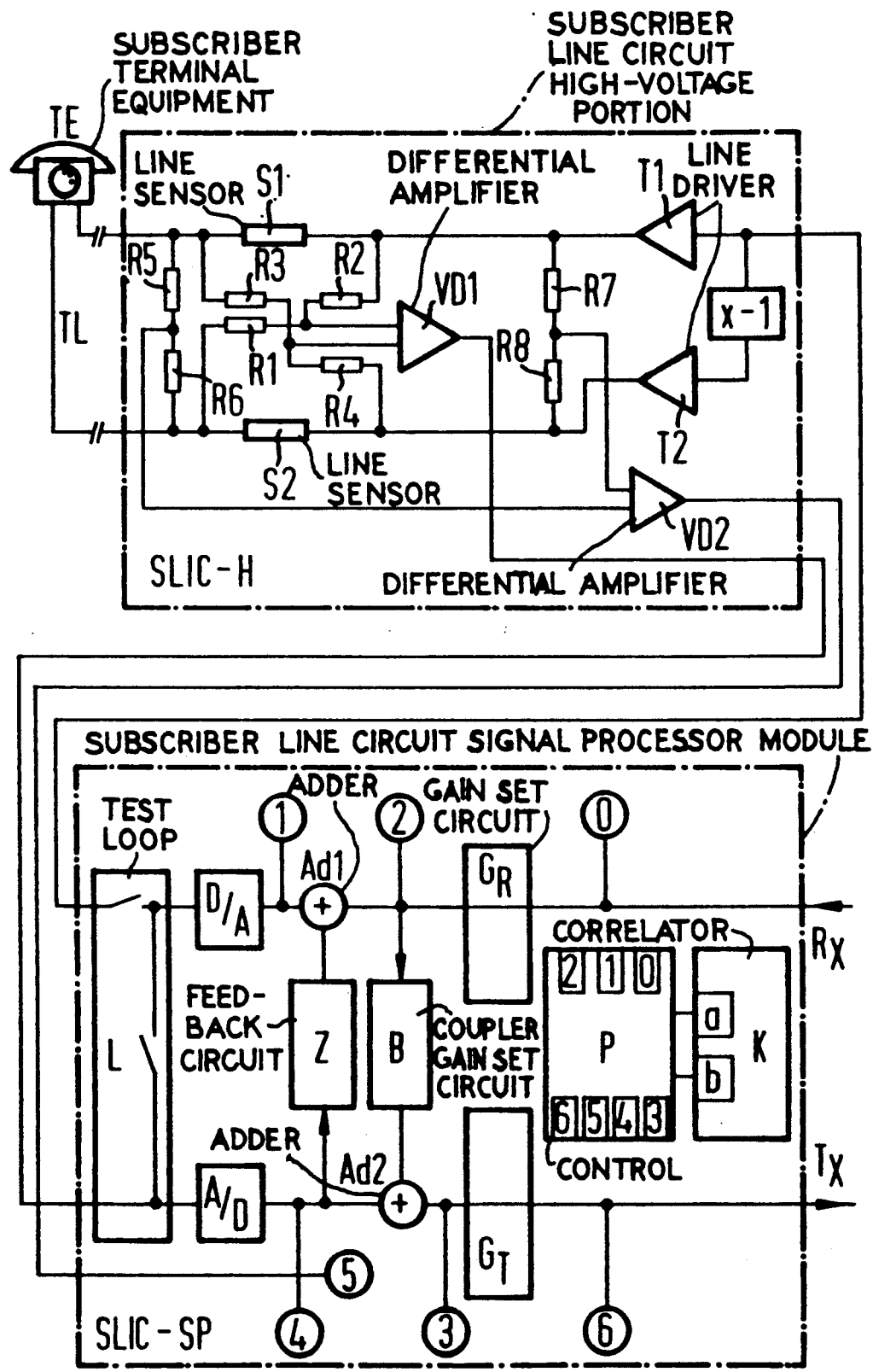
FIG. 2 is a schematic illustration of a subscriber line circuit divided into a high-voltage portion and a signal processor module and having the properties required for the implementation of the method of the present invention.

Referring to FIG. 2, the subscriber terminal equipment TE is connected to the high-voltage portion SLIC-H of a subscriber line circuit via a subscriber line TL. A pair of line sensors S1 and S2 that serve the purpose of identifying the state of the subscriber line loop are indicated as critical components of the high-voltage portion. A transverse current signal is acquired via the resistors R1–R4 and via a differential amplifier VD1, the transverse current signal serving as a transmission signal. Receiving signals arriving from the opposite direction are amplified via a pair of line drivers T1 and T2 and are forwarded to the leads of the subscriber line. The high-voltage portion also comprises a plurality of resistors R5–R8 that are connected between the leads of the subscriber line and at whose junctions voltages are taken that are supplied to the inputs of a differential amplifier VD2 for acquiring a signal corresponding to the direct-access component current.

As a further component of the subscriber line circuit, FIG. 2 also symbolically illustrates a signal processor module SLIC-SP. The components of the signal processor module connected to the receiving branch Rx or, respectively, to the transmitting branch Tx of this module or, respectively, inserted into these branches are to be understood as functional blocks. In detail, an analog-to-digital converter A/D or, respectively, a digital-to-analog converter D/A are provided as well as a feedback circuit Z that, via an adder Ad1 (further connected to receive an input signal via the receiving branch input Rx) supplies a portion of the signal arising in the analog-to-digital converter A/D to the digital-to-analog converter D/A that serves for setting the two-wire impedance. A coupler B that lies between the receiving branch Rx and at the transmitting branch Tx via an adder Ad2 and that serves for two-wire-to-four-wire conversion, is shown along with gain setting circuits GR and GT which set the gain in the corresponding branches Rx and Tx, and a control P in which a digital interface is also realized. Also illustrated is a correlator K. The numerals 2–5 in the receiving branch and in the transmitting branch or, respectively, at the output of the differential amplifier VD2 connected thereto indicate access points which the signal processor accesses via the digital interface, for which reason these numerals are also marked on the control P.

In accordance with the invention, a respective pair of voltages is selected from the voltages that appear at the indicator points during operation of the subscriber line circuit and this pair of voltages is subjected to the formation of a correlation product from which a specific transmission property is then respectively calculated. The following table thereby illustrates the various possible combinations or, respectively, various transmission properties to be tested.

| Types of Measurement | Measured Value at the Measuring Point a | Measured Value at the Measuring Point b |
| --- | --- | --- |
| reflection attenuation | 2 | 1 |
| gain Rx | 0 | 2 |
| gain Tx | 3 | 6 |
| hybrid transfer attenuation | 2 | 3 |
| transmission level on line | 2 | 4 |
| balance measurement | 5 | 4 |

| Types of Measurement | Measured Value at the Measuring Point a | Measured Value at the Measuring Point b |
|---|---|---|
| balance measurement | 2 | 5 |

By forming a correlation product of two signal quantities, a particular information concerning the degree of dependency of these signal quantities is obtained and this can lie between 0, i.e. complete independence, and 1, i.e. complete dependence.

When, therefore, a signal that is the amplified signal received via the input Rx appears at the measuring point 2 is compared to the signal at the measuring point 1 that corresponds to the signal reduced by the portion of the reception signal reflected at the two-wire input and returned via the feedback circuit Z, then the correlation formation provides information concerning the reflection attenuation.

When the signal quantities at the input side and the output side of the gain setting circuits $G_R$ and $G_T$, i.e. the signal quantities at the measuring points 0 and 2 or, respectively, the measuring points 3 and 6 are placed in relationship to one another by forming a correlation product, then the result of the formation of the correlation product supplies information concerning the gain in the receiving branch or, respectively, in the transmitting branch.

When the signal at the measuring point 3 that represents the signal proceeding onto the transmitting branch Tx and that is composed of the signal coming from the two-wire line, i.e. from the subscriber line circuit portion SLIC-H and a portion of the reception signal incoming via the reception branch Rx that corresponds to the reflection at the two-wire-to-four-wire junction, (whereby this portion is defined by the setting of the coupling at the coupler B) is correlated with the reception signal at the measuring point 2 then a value for the hybrid transfer attenuation results from the correlation product.

When the signals at the measuring point 5 at which as presented, a signal corresponding to the longitudinal current is acquired is subjected to a correlation with signals measurable either at the measuring point 2 or at the measuring point 4, information concerning the balance conditions of the subscriber line circuit is obtained.

Instead of a check during active operation of the subscriber line circuit, the reaction to separately-supplied signals that are returned via a test loop L can also occur during the passive operation thereof.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for checking transmission properties of a subscriber line circuit together with a subscriber line and subscriber terminal equipment connected thereto in a digital time-division multiplex telephone system, in which the subscriber line circuit comprises a high-voltage module including line drivers and elements for indicating the subscriber line state, and a signal processor module comprising an analog-to-digital converter and digital-to-analog converter with appertaining filtering, a two-wire-to-four-wire conversion connection, in which the realization of the two-wire impedance and the receiving signal amplification occur, the method comprising the steps of:

(a) accessing and sensing a plurality of operating signals at a plurality of circuit points of the transmitting and receiving branches of the signal processor module via a digital interface, including:
converting analog signals to digital signals,
converting digital signals to analog signals,
feeding back said transmitting branch to said receiving branch to set two-wire impedance,
coupling said receiving branch to said transmitting branch for two-to-four wire conversion, and
setting gain in said transmitting and receiving branches;

(b) forming correlation products from selected combinations of the voltage values of two sensed signals, wherein predetermined selected combinations are indicative of predetermined transmission properties; and (c) evaluating the correlation products for providing an information concerning the quality of certain transmission properties.

2. The method for checking transmission properties of a subscriber circuit, according to claim 1, wherein the step (a) of accessing and sensing a plurality of operating signals is further defined as:

(a1) accessing and sensing signals representing longitudinal current at a circuit point of the high-voltage module for incorporating into the correlation operation.

* * * * *